US011367003B2

United States Patent
Katoh et al.

(10) Patent No.: US 11,367,003 B2
(45) Date of Patent: Jun. 21, 2022

(54) NON-TRANSITORY COMPUTER-READABLE STORAGE MEDIUM, LEARNING METHOD, AND LEARNING DEVICE

(71) Applicant: FUJITSU LIMITED, Kawasaki (JP)

(72) Inventors: Takashi Katoh, Yokohama (JP); Kento Uemura, Kawasaki (JP); Suguru Yasutomi, Kawasaki (JP); Toshio Endoh, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 15/947,423

(22) Filed: Apr. 6, 2018

(65) Prior Publication Data

US 2018/0300632 A1    Oct. 18, 2018

(30) Foreign Application Priority Data

Apr. 17, 2017  (JP) .............................. JP2017-081645

(51) Int. Cl.
*G06N 3/08*  (2006.01)
*G06K 9/62*  (2022.01)
*G06N 3/04*  (2006.01)

(52) U.S. Cl.
CPC .......... *G06N 3/088* (2013.01); *G06K 9/6218* (2013.01); *G06K 9/6257* (2013.01); *G06K 9/6263* (2013.01); *G06N 3/0454* (2013.01); *G06N 3/084* (2013.01)

(58) Field of Classification Search
CPC ...... G06N 3/088; G06N 3/0454; G06N 3/084; G06K 9/6218; G06K 9/6257; G06K 9/6263
See application file for complete search history.

(56) References Cited

U.S. PATENT DOCUMENTS

2017/0061329 A1    3/2017    Kobayashi et al.

FOREIGN PATENT DOCUMENTS

| JP | 2013-134752 | 7/2013 |
| JP | 2014-026455 | 2/2014 |
| JP | 2017-049677 | 3/2017 |

OTHER PUBLICATIONS

Hiroyuki Matsunaga, et al., "Mixed Supervised/Unsupervised Learning of Nearest Neighbor Classifiers", The Transactions of the Institute of Electronics, Information and Communication Engineers D-II, vol. J80-D-II, No. 11, 1997, pp. 3004-3010. Machine Translation of JPOA dated Jan. 5, 2021 Cited in JPOA dated Jan. 5, 2021 corresponding to Japanese Patent Application No. 2017-081645.
JPOA—Office Action of Japanese Patent Application No. 2017-081645 dated Jan. 5, 2021 with Machine Translation.

*Primary Examiner* — Robert G Bachner
(74) *Attorney, Agent, or Firm* — Fujitsu Patent Center (57) ABSTRACT

A non-transitory computer-readable storage medium storing a program that causes a computer to execute a process, the process including obtaining a feature quantity of input data by using a feature generator, generating a first output based on the feature quantity by using a supervised learner for labeled data, generating a second output based on the feature quantity by using an unsupervised learning processing for unlabeled data, and changing a contribution ratio between a first error and a second error in a learning by the feature generator, the first error being generated from the labeled data and the first output, the second error being generated from the unlabeled data and the second output.

13 Claims, 9 Drawing Sheets

|  | KIND OF DATA | | | |
|---|---|---|---|---|
|  | a | b | c | d |
| SUPERVISED POSITIVE EXAMPLE | a+ | b+ | c+ | d+ |
| SUPERVISED NEGATIVE EXAMPLE | a- | b- | c- | d- |
| UNSUPERVISED POSITIVE EXAMPLE | a+ | b+ | c+ | d+ |
| UNSUPERVISED NEGATIVE EXAMPLE | a- | b- | c- | d- |

NON-TRANSITORY COMPUTER-READABLE STORAGE MEDIUM, LEARNING METHOD, AND LEARNING DEVICE

CROSS-REFERENCE TO RELATED APPLICATION

This application is based upon and claims the benefit of priority of the prior Japanese Patent Application No. 2017-81645, filed on Apr. 17, 2017, the entire contents of which are incorporated herein by reference.

FIELD

The embodiment discussed herein is related to a non-transitory computer-readable storage medium, a learning method, and a learning device.

BACKGROUND

When supervised learning is performed for a purpose of classification, regression, or the like in a field of machine learning, semi-supervised learning is used which combines supervised learning using supervised data and unsupervised learning using unsupervised data. As one system of the semi-supervised learning, there is a method in which a feature generator, a supervised learner, and an unsupervised learner are used, the supervised learner performs learning for an original purpose such as classification or regression based on feature quantities generated by the feature generator, and, for example, reconstruction, compression, noise removal, or interpolation of unsupervised data is learned based on the unsupervised data separately prepared by unsupervised learning.

For example, when description is made by taking reconstruction of unsupervised data as an example, the supervised learner performs parameter adjustment within the learner so as to minimize a supervised error as a difference between a teacher label and output of the supervised learner. In addition, the unsupervised learner performs learning so as to minimize an unsupervised error as a difference between an input and output of the unsupervised learner. Then, the feature generator performs learning so as to minimize a sum total of the supervised error and the unsupervised error.

Examples of the related art include Japanese Laid-open Patent Publication No. 2014-026455 and Japanese Laid-open Patent Publication No. 2017-049677.

SUMMARY

According to an aspect of the embodiment, a non-transitory computer-readable storage medium storing a program that causes a computer to execute a process, the process including obtaining a feature quantity of input data by using a feature generator, generating a first output based on the feature quantity by using a supervised learner for labeled data, generating a second output based on the feature quantity by using an unsupervised learning processing for unlabeled data, and changing a contribution ratio between a first error and a second error in a learning by the feature generator, the first error being generated from the labeled data and the first output, the second error being generated from the unlabeled data and the second output.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

However, in the above-described semi-supervised learning, depending on a difference in progress between the supervised learning and the unsupervised learning, either the error of the supervised learning or the error of the unsupervised learning may not be decreased, and learning accuracy may not be improved. For example, depending on the nature of a problem solved by the supervised learner and the unsupervised learner, a degree of difficulty of learning differs, and progress in learning of the supervised learner and the unsupervised learner varies.

In such a case, a situation tends to occur in which the feature generator generates features that decrease only one error, it becomes difficult to generate features that decrease the other error while maintaining the decreased error, much time is taken for the other learner to perform learning, and learning does not progress. For example, when only the unsupervised error is decreased, the supervised learning is not progressing, and a learning accuracy with respect to an original purpose is degraded. On the other hand, when only the supervised error is decreased, the supervised learning is progressing excessively, resulting in over-learning, and a learning accuracy with respect to data other than training data is degraded.

In one aspect, it is an object to provide a learning program, a learning method, and a learning device that may improve the learning accuracy of semi-supervised learning.

According to one embodiment, it is possible to improve the learning accuracy of semi-supervised learning.

Embodiments of a learning program, a learning method, and a learning device disclosed in the present application will hereinafter be described in detail with reference to the drawings. It is to be noted that the present technology is not limited by the present embodiments. The respective embodiments may be combined with each other as appropriate within a scope in which no contradiction occurs.

First Embodiment

[Description of Learning Processing]

Figure 1:
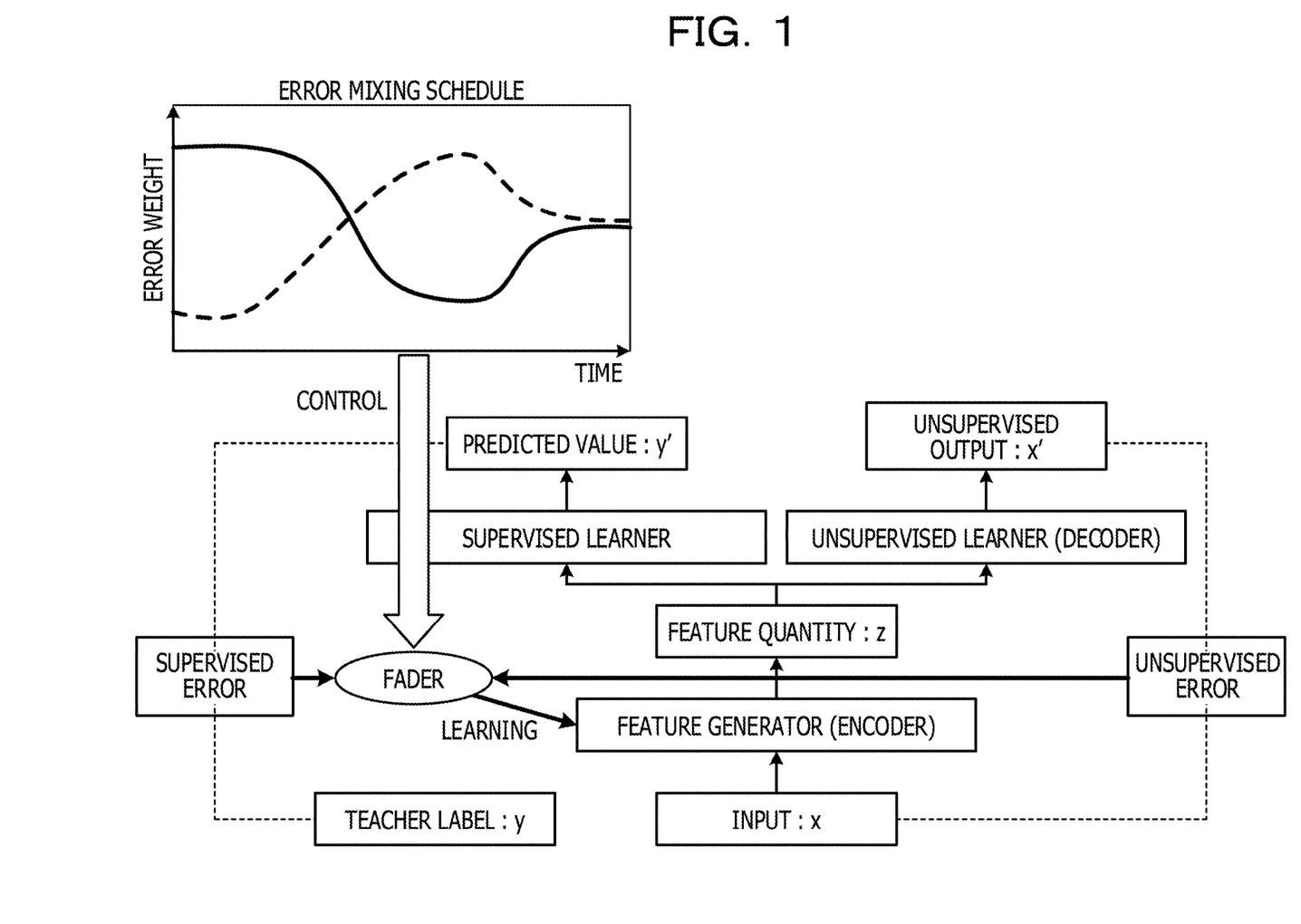
FIG. 1 is a diagram of assistance in explaining semi-supervised learning according to a first embodiment.

FIG. 1 is a diagram of assistance in explaining semi-supervised learning according to a first embodiment. As illustrated in FIG. 1, a learning device according to the first embodiment is an example of an information processing device that performs semi-supervised learning using a feature generator, a supervised learner, and an unsupervised learner.

In the first embodiment, description will be made by taking an example in which unsupervised learning performs reconstruction learning, and therefore the feature generator may be described as an encoder and the unsupervised learner may be described as a decoder. However, learning contents and functions are not limited. In addition, each learner may adopt various learning methods such as a gradient method and a neural network. In addition, an image will be illustrated and described as an example for learning, but is a mere example and does not limit learning contents and a learning target.

The feature generator generates a feature quantity z from an input x. For example, in a case where a learning target is an image, the feature generator generates, as feature quantities, an edge within the image, contrast, the position of an eye or a nose within the image, and the like.

The supervised learner performs learning processing such as classification, regression, or the like for labeled supervised data. For example, the supervised learner receives, as an input, a feature quantity z generated from an input x as supervised data, and outputs a predicted value y'. Then, the supervised learner performs learning so as to minimize a supervised error as an error between the predicted value y' and an output y, which is known in advance with respect to the input x. For example, the supervised learner determines that there is a small supervised error in a case where an output when an image of a vehicle is input is the vehicle, and determines that there is a large supervised error in a case where an output when an image of a vehicle is input is a person. The supervised learner performs learning so as to decrease the supervised error.

The unsupervised learner performs learning processing such as reconstruction, compression, noise removal, or interpolation for unlabeled unsupervised data. For example, the unsupervised learner receives, as an input, a feature quantity z generated from an input x as unsupervised data, and outputs a predicted value x'. Then, the unsupervised learner performs learning so as to minimize an unsupervised error as an error between the predicted value x' and the input x. For example, the unsupervised learner performs learning so as to be able to reconstruct the input image of the vehicle correctly.

The learning device including such learners performs control so as not to generate feature quantities that decrease only one error by dynamically changing a balance between the supervised error and the unsupervised error used by the encoder for learning. For example, the learning device changes a contribution ratio between the supervised error and the unsupervised error in a process of the learning. The learning device thus improves the learning accuracy of the semi-supervised learning.

Figure 2:
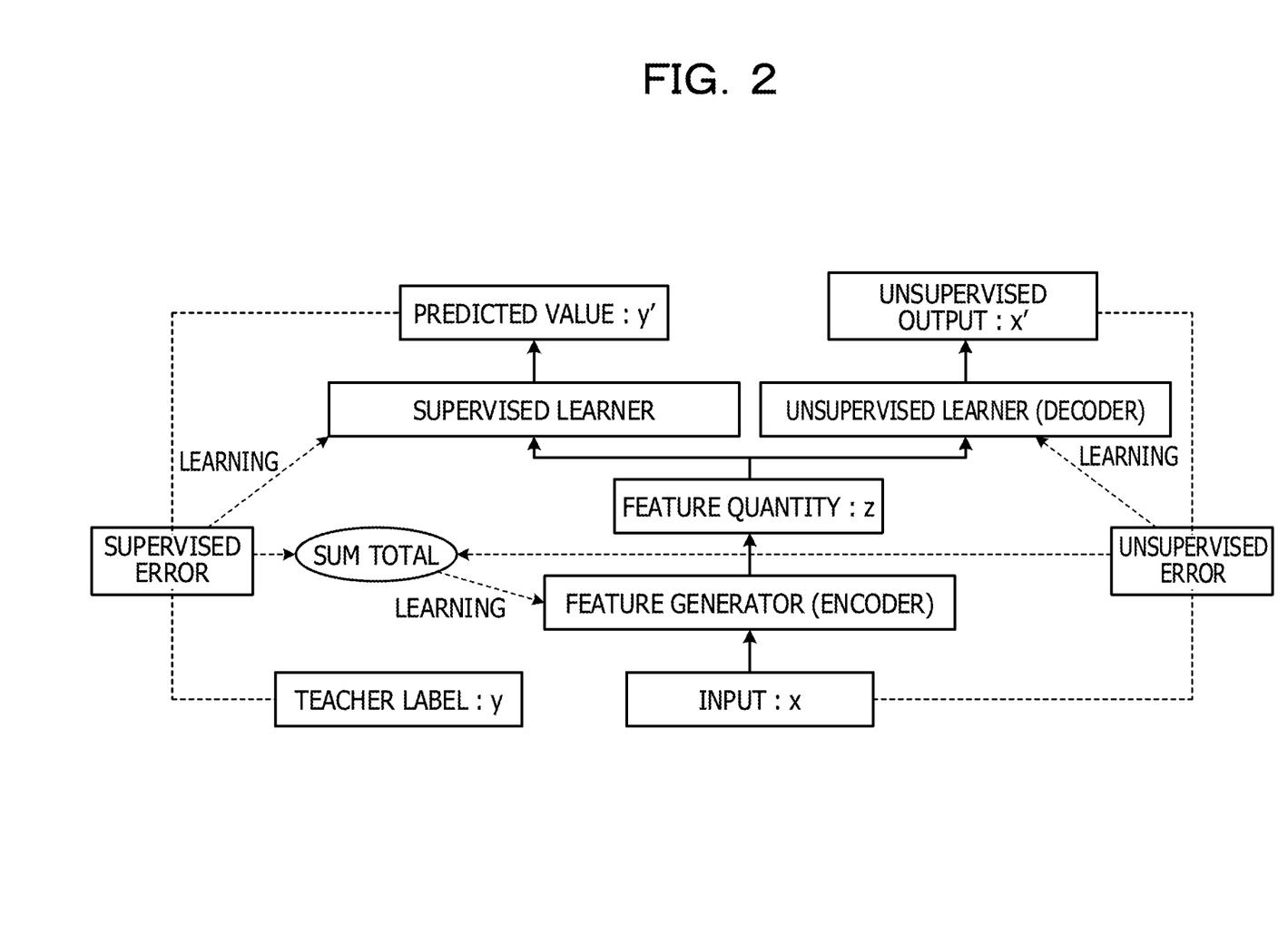
FIG. 2 is a diagram of assistance in explaining ordinary semi-supervised learning.

On the other hand, in ordinary semi-supervised learning, the feature generator performs learning so as to minimize a sum total of the supervised error and the unsupervised error. FIG. 2 is a diagram of assistance in explaining ordinary semi-supervised learning. As illustrated in FIG. 2, a supervised learner performs learning so as to minimize a supervised error, and an unsupervised learner performs learning so as to minimize an unsupervised error. Then, a feature generator performs learning so as to minimize a sum total of the supervised error and the unsupervised error. At this time, the feature generator calculates the sum total in a ratio determined in advance. For example, the feature generator sets a mixing ratio between the supervised error and the unsupervised error at 2:1 or the like, calculates "Sum Total=(Supervised Error×2)+Unsupervised Error," and performs learning so as to minimize the sum total.

However, when the ratio at the time of calculation of the sum total is fixed randomly, learning accuracy is degraded depending on variations in progress of learning. For example, when only the unsupervised error is decreased, the supervised learning is not progressing, and an accuracy with respect to an original purpose is not increased. On the other hand, when only the supervised error is decreased, the supervised learning is progressing excessively, thus resulting in over-learning, and an accuracy with respect to data other than training data is not increased. For example, in a case where learning of distributed representation such as Word2Vec or Doc2Vec is used in the unsupervised learner, there are a very large number of parameters not directly related to the supervised learning of the encoder such as parameters related to words not included in supervised data. Thus, once deviation occurs to generation of features that decrease only the error of the unsupervised learning, it is difficult to make correction, and the supervised learning does not progress. As a result, learning accuracy is degraded in the ordinary semi-supervised learning.

Accordingly, as described above, the learning device according to the first embodiment achieves an improvement in learning accuracy of the semi-supervised learning by advancing the learning so as to minimize an error obtained by mixing a supervised error and an unsupervised error in a dynamically changing ratio.

[Functional Configuration]

Figure 3:
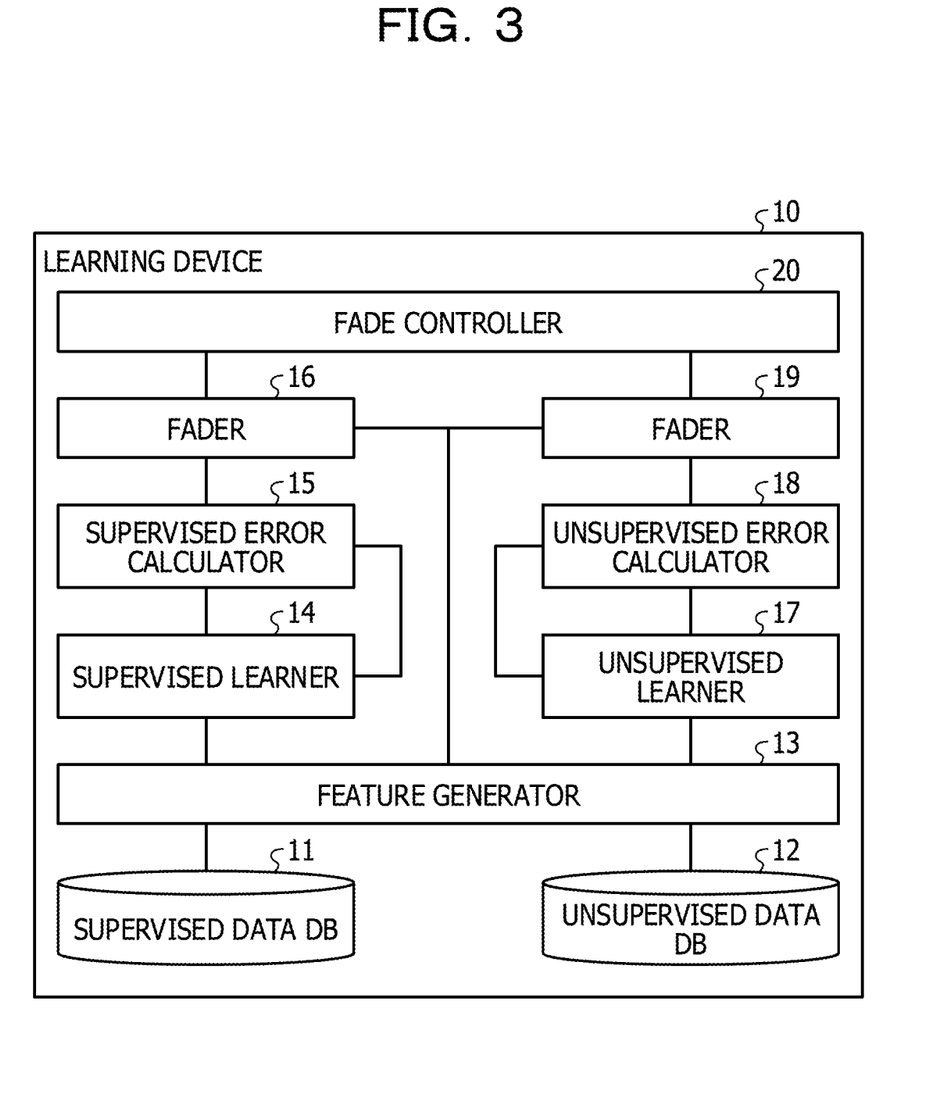
FIG. 3 is a functional block diagram illustrating a functional configuration of a learning device according to the first embodiment.

FIG. 3 is a functional block diagram illustrating a functional configuration of a learning device according to the first embodiment. As illustrated in FIG. 3, a learning device 10 includes a supervised data database (DB) 11, an unsupervised data DB 12, a feature generator 13, a supervised learner 14, a supervised error calculator 15, a fader 16, an unsupervised learner 17, an unsupervised error calculator 18, a fader 19, and a fade controller 20. Incidentally, the feature generator 13 is an example of a generating unit, the supervised learner 14 is an example of a first generating unit, the unsupervised learner 17 is an example of a second generating unit, and the fade controller 20 is an example of a ratio control unit.

Incidentally, the supervised data DB 11 and the unsupervised data DB 12 are stored in a memory, a hard disk, or the like. The feature generator 13, the supervised learner 14, the supervised error calculator 15, the fader 16, the unsupervised learner 17, the unsupervised error calculator 18, the fader 19, and the fade controller 20 may also be implemented by a process executed by a processor or the like.

The supervised data DB 11 is a database that stores a labeled supervised data group, and stores a supervised data group that trains the supervised learner 14. For example, when description is made by taking a photograph as an example, the supervised data DB 11 stores a data group to which a label of a subject is added, the label indicating what is photographed, such as a vehicle or a person.

The unsupervised data DB 12 is a database that stores an unlabeled unsupervised data group, and stores an unsupervised data group that trains the unsupervised learner 17. For example, the unsupervised data DB 12 stores a data group to which no label is added as viewed from supervised data. When description is made by taking the above-described example, the unsupervised data DB 12 stores a data group to which a label of a date or the like other than a subject is added, a data group to which no label is added at all, or the like. Hence, many pieces of unsupervised data may be employed, so that the learning accuracy of the unsupervised learning may be improved.

The feature generator 13 is a learner that calculates a sum total by mixing a supervised error and an unsupervised error with each other according to a mixture ratio generated by the fade controller 20, and performs learning so as to minimize the sum total. For example, the feature generator 13 calculates a sum total of a supervised error output from the fader 16 and an unsupervised error output from the fader 19, and performs learning so as to minimize the sum total.

Then, with respect to the supervised data DB 11, the feature generator 13 reads supervised data from the supervised data DB 11, sets the supervised data as an input x, generates a feature quantity z from the input x using a learning result, and outputs the feature quantity z to the supervised learner 14. Similarly, with respect to the unsupervised data DB 12, the feature generator 13 reads unsupervised data from the unsupervised data DB 12, sets the unsupervised data as an input x, generates a feature quantity z from the input x using a learning result, and outputs the feature quantity z to the unsupervised learner 17.

The supervised learner 14 is a learner that performs learning so as to minimize a supervised error using the supervised data stored in the supervised data DB 11. For example, the supervised learner 14 generates a predicted value y' from the feature quantity z generated from the input x as the supervised data by the feature generator 13. The supervised learner 14 then outputs the generated predicted value y' to the supervised error calculator 15.

The supervised error calculator 15 calculates the supervised error. For example, the supervised error calculator 15 calculates, as the supervised error, a difference between the predicted value y' input from the supervised learner 14 and supervised data y corresponding to the input value x at a time of generation of the predicted value y'. Then, the supervised error calculator 15 feeds back the supervised error to the supervised learner 14 to make the supervised learner 14 perform further learning, and outputs the supervised error to the fader 16.

The fader 16 increases or decreases the ratio of the supervised error according to a mixing ratio notified from the fade controller 20. For example, when the fader 16 is notified of "2:1" as the mixing ratio between the supervised error and the unsupervised error from the fade controller 20, the fader 16 doubles the supervised error input from the supervised error calculator 15, and outputs the doubled supervised error to the feature generator 13.

The unsupervised learner 17 is a learner that performs learning so as to minimize the unsupervised error using the unsupervised data stored in the unsupervised data DB 12. For example, the unsupervised learner 17 generates an output x' from the feature quantity z generated from the input x as the unsupervised data by the feature generator 13. The unsupervised learner 17 then outputs the generated output x' to the unsupervised error calculator 18.

The unsupervised error calculator 18 calculates the unsupervised error. For example, the unsupervised error calculator 18 calculates, as the unsupervised error, a difference between the output x' input from the unsupervised learner 17 and the input value x at a time of generation of the output x'. Then, the unsupervised error calculator 18 feeds back the unsupervised error to the unsupervised learner 17 to make the unsupervised learner 17 perform further learning, and outputs the unsupervised error to the fader 19.

The fader 19 increases or decrease the ratio of the unsupervised error according to the mixing ratio notified from the fade controller 20. For example, when the fader 19 is notified of "1:1.5" as the mixing ratio between the supervised error and the unsupervised error from the fade controller 20, the fader 19 multiplies the unsupervised error input from the unsupervised error calculator 18 by 1.5, and outputs the result to the feature generator 13.

The fade controller 20 determines a contribution ratio between the supervised error and the unsupervised error. For example, the fade controller 20 determines a weight when the feature generator 13 calculates a sum total of the supervised error and the unsupervised error, and outputs the weight to the fader 16 and the fader 19.

A method of determining the contribution ratio will be concretely described in the following. The fade controller 20 may determine the contribution ratio according to a mixing schedule describing a mixing ratio in relation to learning time, the mixing schedule being passed as a hyperparameter at a time of learning.

For example, the mixing schedule may be set by a user in advance according to the nature of a problem for the supervised learning and the unsupervised learning. For example, the fade controller 20 dynamically changes the mixing ratio according to the mixing schedule generated based on past learning results. The mixture generated here is generated by a manager analyzing various learning results in the past, and a schedule is made such that the ratio of the unsupervised learning is first set high and thereafter the ratio of the supervised learning is set high, for example.

In addition, in a case where learning of distributed representation such as Word2Vec is used in the unsupervised learning, the fade controller 20 may generate a schedule such that the ratio of the supervised learning is set high in a short period in an initial stage of learning. To cite a concrete example, the fade controller 20 sets high the ratio of the supervised error at a time of calculation of the sum total, by doubling the error of the supervised learning in the initial stage of learning, for example. Incidentally, the initial stage of learning may be a given time such as two minutes, or may be the number of pieces of training data such as 100 pieces of training data.

In addition, the fade controller 20 may divide data used for learning into training data and validation data, and search for a schedule in which the supervised error of the validation data is decreased most by a hyperparameter search.

For example, the fade controller 20 sets 90 percent of the supervised data group as the training data, and sets the remaining ten percent as the validation data. The fade controller 20 then generates a plurality of mixing schedules. For example, the fade controller 20 generates a plurality of mixing patterns in which "3:1" is set as the mixing ratio (mixture ratio) between the supervised error and the unsupervised error from a start of processing to 100 pieces of training data, "1:3" is set as the mixing ratio from a 101st piece of training data to a 200th piece of training data, and "1:1" is set as the mixing ratio from a 201th piece of training data on down. Then, the fade controller 20 notifies the generated plurality of mixing schedules to each fader, and notifies the training data obtained by the division to the feature generator 13. Thus, the fade controller 20 makes the supervised learner 14 and the unsupervised learner 17 perform learning using the training data according to each of the mixing schedules.

Then, the fade controller 20 applies the validation data to the supervised learner 14 made to perform learning according to each of the mixing schedules. Thereafter, the fade controller 20 identifies a mixing schedule in which the supervised error obtained by applying the validation data is smallest, and determines that the mixing schedule is to be adopted. Thus, the fade controller 20 notifies the mixing schedule determined in preprocessing of learning to each fader, and makes each learner start learning. Incidentally, a mixing schedule may also be adopted in which a criterion (for example, a threshold value) determined in advance is satisfied by a feature of the learners, a learning period, or the like as well as the mixing schedule in which the supervised error obtained by applying the validation data is smallest.

As yet another example of generating the mixing schedule, the fade controller 20 may also dynamically control the mixing ratio according to a state of progress of learning. For example, the fade controller 20 divides data into training data and validation data, and starts learning in an appropriate error mixing ratio using the training data. During the learning, the fade controller 20 checks the supervised error (training error) corresponding to the training data and the supervised error (validation error) corresponding to the validation data. Then, when the validation error is too large as compared with the training error, the fade controller 20 determines that there is an over-learning state and increases the mixing ratio of the unsupervised error, or otherwise determines that there is an appropriate or insufficient learning state and decreases the mixing ratio of the unsupervised error.

For example, the fade controller 20 sets 90 percent of the supervised data group as supervised training data, and sets the remaining ten percent as supervised validation data. In addition, the fade controller 20 sets 2:1 as the mixture ratio between the supervised error and the unsupervised error. Then, the fade controller 20 notifies the respective divided pieces of data to the feature generator 13, and notifies the mixture ratio to each fader to make learning performed.

Thereafter, when a given time has passed or when learning of a given number of pieces of training data is completed, the fade controller 20 makes each learner perform learning using the validation data. Here, the fade controller 20 calculates a difference (supervised difference) between the supervised error (supervised training error) when the training data is used and the supervised error (supervised validation error) when the validation data is used.

Then, when the supervised difference (Supervised Validation Error–Supervised Training Error) is equal to or more than a first threshold value, there is too large an error, and therefore the fade controller 20 changes the mixture ratio between the supervised error and the unsupervised error from "2:1" to "2:1.5," "1:2," or the like so as to increase the mixing ratio of the unsupervised error. In addition, when the supervised difference is less than the first threshold value and equal to or more than a second threshold value, the fade controller 20 maintains the mixture ratio at "2:1" as it is. In addition, when the supervised difference is less than the second threshold value, there is too small an error, and therefore the fade controller 20 changes the mixture ratio between the supervised error and the unsupervised error from "2:1" to "2.5:1" or the like so as to increase the mixing ratio of the supervised error. Incidentally, the threshold values may be set arbitrarily.

Thereafter, the fade controller 20 notifies the mixture ratio after the change to each fader, makes learning continued, and repeats the adjustment of the above-described mixture ratio when a given time has passed or when learning of a given number of pieces of training data is completed after the continuation. Thus, the fade controller 20 determines whether or not the mixture ratio is appropriate and achieves dynamic change of the mixture ratio each time learning is completed at a given interval.

Incidentally, in each of the above-described examples, an example in which attention is directed to the supervised error has been described. However, there is no limitation to this, and similar determination may be made for the unsupervised error. In addition, it is also possible to direct attention to both the supervised error and the unsupervised error.

For example, the fade controller 20 sets 90 percent of the supervised data group as supervised training data and sets the remaining ten percent as supervised validation data, and sets 90 percent of the unsupervised data group as unsupervised training data and sets the remaining ten percent as unsupervised validation data. In addition, the fade controller 20 sets 2:1 as the mixture ratio between the supervised error and the unsupervised error. Then, the fade controller 20 notifies the respective divided pieces of data to the feature generator 13, and notifies the mixture ratio to each fader to make learning performed.

Thereafter, the fade controller 20 makes each learner perform learning using the validation data when a given time has passed or when learning of a given number of pieces of training data is completed. Here, the fade controller 20 calculates a difference (supervised difference) between the supervised error (supervised training error) when the training data is used and the supervised error (supervised validation error) when the validation data is used. Similarly, the fade controller 20 calculates a difference (unsupervised difference) between the unsupervised error (unsupervised training error) when the training data is used and the unsupervised error (unsupervised validation error) when the validation data is used.

Then, the fade controller 20 compares the supervised difference and the unsupervised difference with each other. When the supervised difference is larger by a threshold value or more, the fade controller 20 may change the mixture ratio so as to increase the mixing ratio of the unsupervised error. When the unsupervised difference is larger by the threshold value or more, the fade controller 20 may change the mixture ratio so as to increase the mixing ratio of the supervised error. In addition, also in this case, determination based on a plurality of threshold values may be applied as in the above-described method.

[Flow of Processing]

Figure 4:
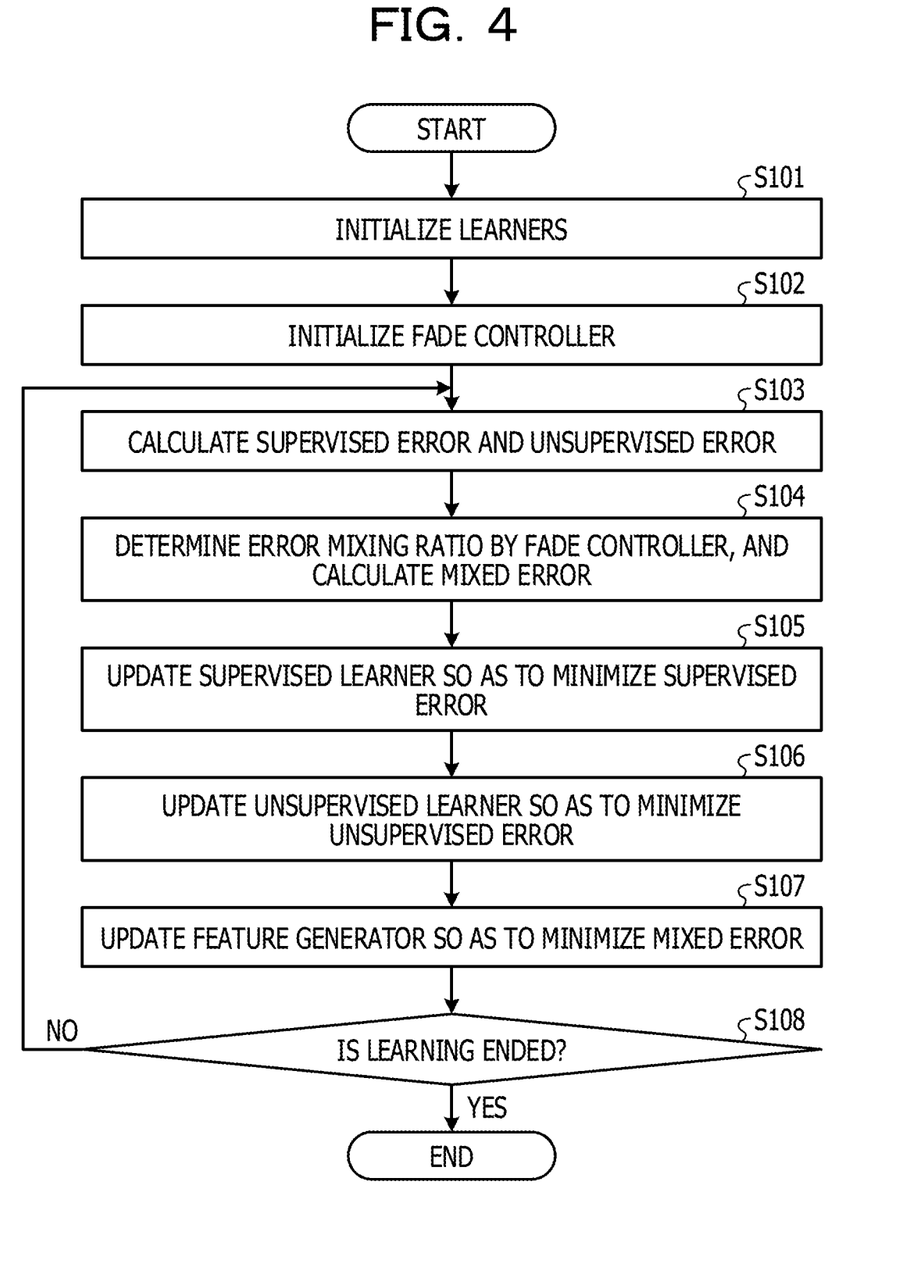
FIG. 4 is a flowchart illustrating a flow of learning processing according to the first embodiment.

FIG. 4 is a flowchart illustrating a flow of learning processing according to the first embodiment. Incidentally, in this case, as illustrated in FIG. 4, when the learning device 10 starts processing, the learning device 10 initializes the feature generator 13, the supervised learner 14, and the unsupervised learner 17, individually (S101).

Next, the learning device 10 initializes the fade controller 20 that controls error mixture, and reads a mixing schedule (S102). For example, the learning device 10 sets a mixing schedule generated in advance, an initial value of the mixing ratio, and the like in the fade controller 20.

Thereafter, the learning device 10 performs learning using each learner and the like, and calculates a supervised error and an unsupervised error (S103). Next, the learning device 10 determines the error mixing ratio in the fade controller 20 by one of the above-described methods using the supervised error and the unsupervised error, and calculates a mixed error (S104). Here, the updated mixing ratio is notified to each fader.

Thereafter, the learning device 10 updates the supervised learner 14 so as to minimize the supervised error (S105), updates the unsupervised learner 17 so as to minimize the unsupervised error (S106), and updates the feature generator 13 so as to minimize the mixed error (S107).

Then, when the learning device 10 continues learning because there is remaining training data or the like (S108: No), the learning device 10 repeats steps from S103 on down. When the learning device 10 ends learning because there is no remaining training data or the like (S108: Yes), the learning device 10 ends the processing.

Effect and Comparative Example

Figure 5:
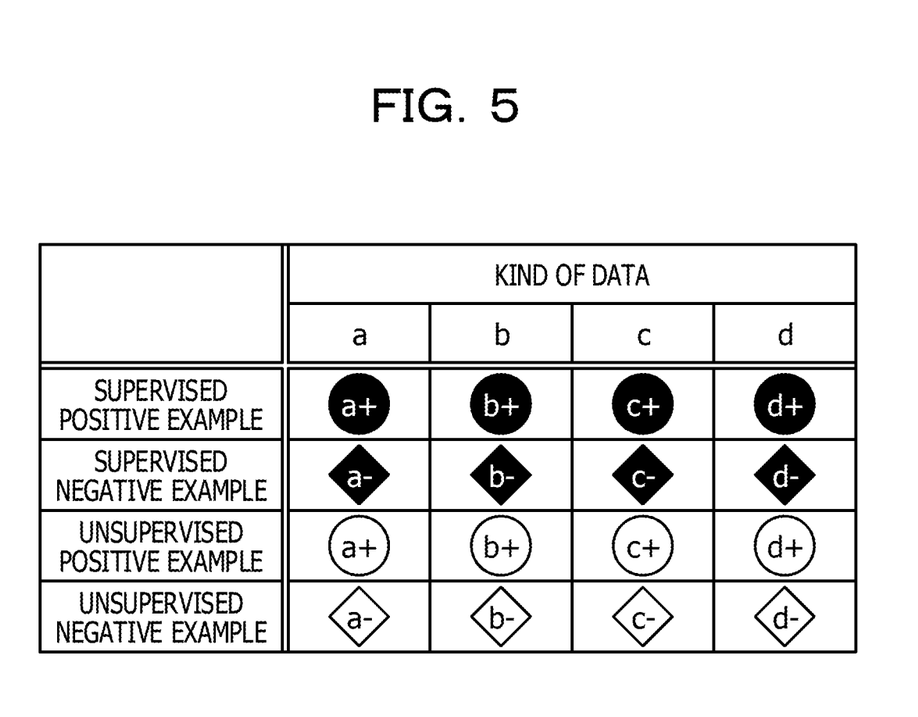
FIG. 5 is a diagram of assistance in explaining a concrete example of semi-supervised learning.

Description will next be made of an example of learning by an ordinary method and an example of learning of the learning device 10 according to the first embodiment. FIG. 5 is a diagram of assistance in explaining a concrete example of semi-supervised learning. In the following, description will be made by taking, as an example, learning that is performed using supervised data in which + and − labels may be used for the learning and unsupervised data in which + and − labels are not used for the learning, and which estimates the labels of the unsupervised data. Incidentally, suppose that feature quantities are two-dimensional, and that the supervised learner is a linear learner that separates positive examples (+) from negative examples (−) by a straight line. In addition, suppose that an encoding and a decoder are learners of distributed representation (clustering), the learners performing learning such that with respect to four kinds (a, b, c, and d) of data illustrated in FIG. 5, same kinds of data come closer and different kinds of data become distant from each other.

Figure 6:
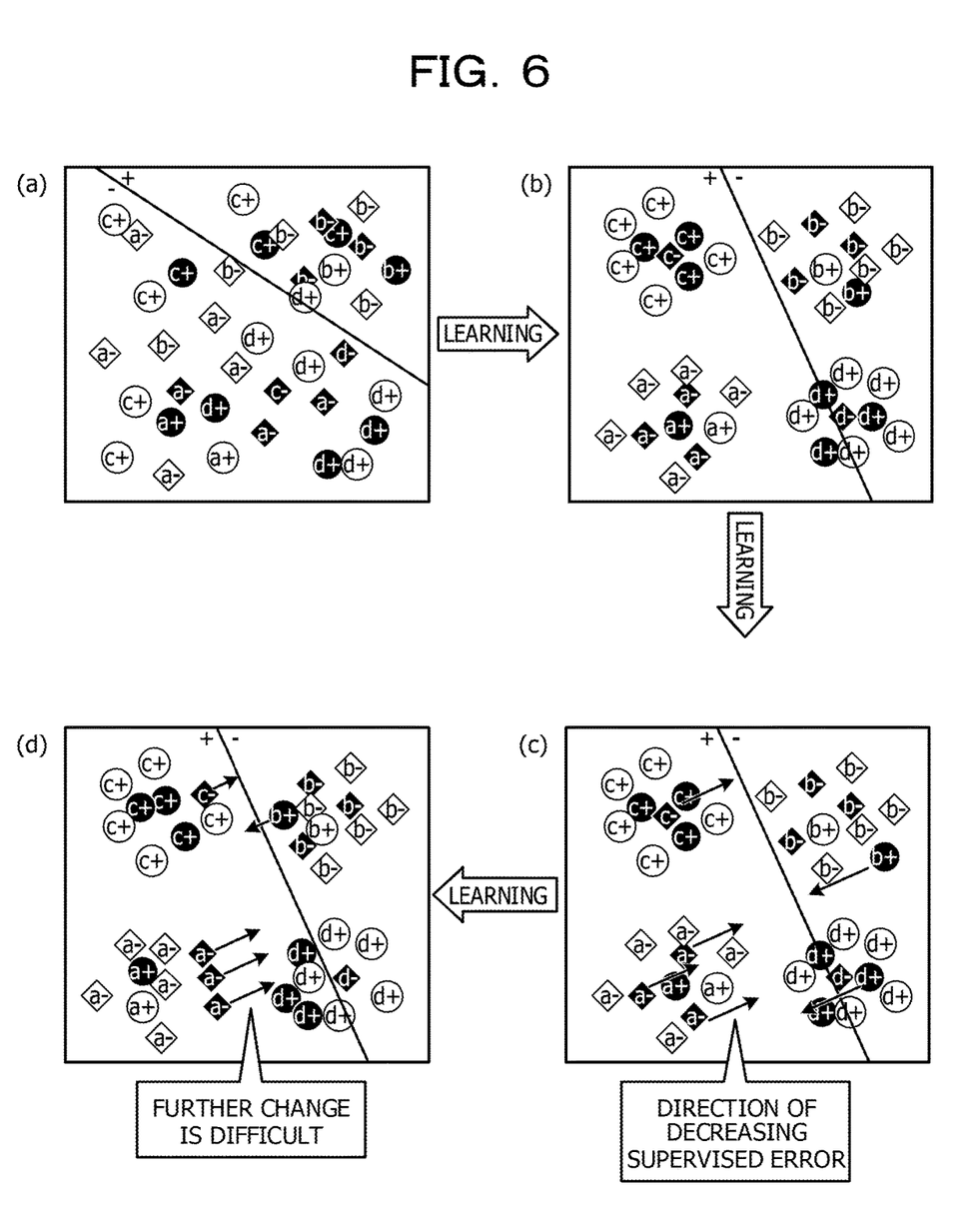
FIG. 6 is a diagram of assistance in explaining a learning result of ordinary semi-supervised learning.

FIG. 6 is a diagram of assistance in explaining a learning result of ordinary semi-supervised learning. (a) of FIG. 6 illustrates distribution of feature quantities before the learning and the separating straight line of the supervised learner. Before the learning, the feature quantities are scattered randomly, and the separating straight line is present at an arbitrary position. When the unsupervised learning progresses first from this state, and the feature quantities deviate to a decrease in the unsupervised error, a state of (b) in FIG. 6 results. For example, positive (+) data and negative (−) data are not separated from each other, and clustering of a, b, c, and d is performed first. Thus, accuracy of separation by the separating straight line is low.

When the supervised learning thereafter progresses further, the feature quantities change, and a state as in (c) of FIG. 6 results. For example, because learning is performed in a direction of decreasing the supervised error, negative example data present on the positive (+) side of the separating straight line tries to move to the negative (−) side of the separating straight line. However, when the supervised error is to be decreased further, a state of (d) in FIG. 6 results. For example, the unsupervised error is increased greatly, and clusters are broken, so that the supervised learning does not progress. Hence, learning accuracy is degraded.

Figure 7:
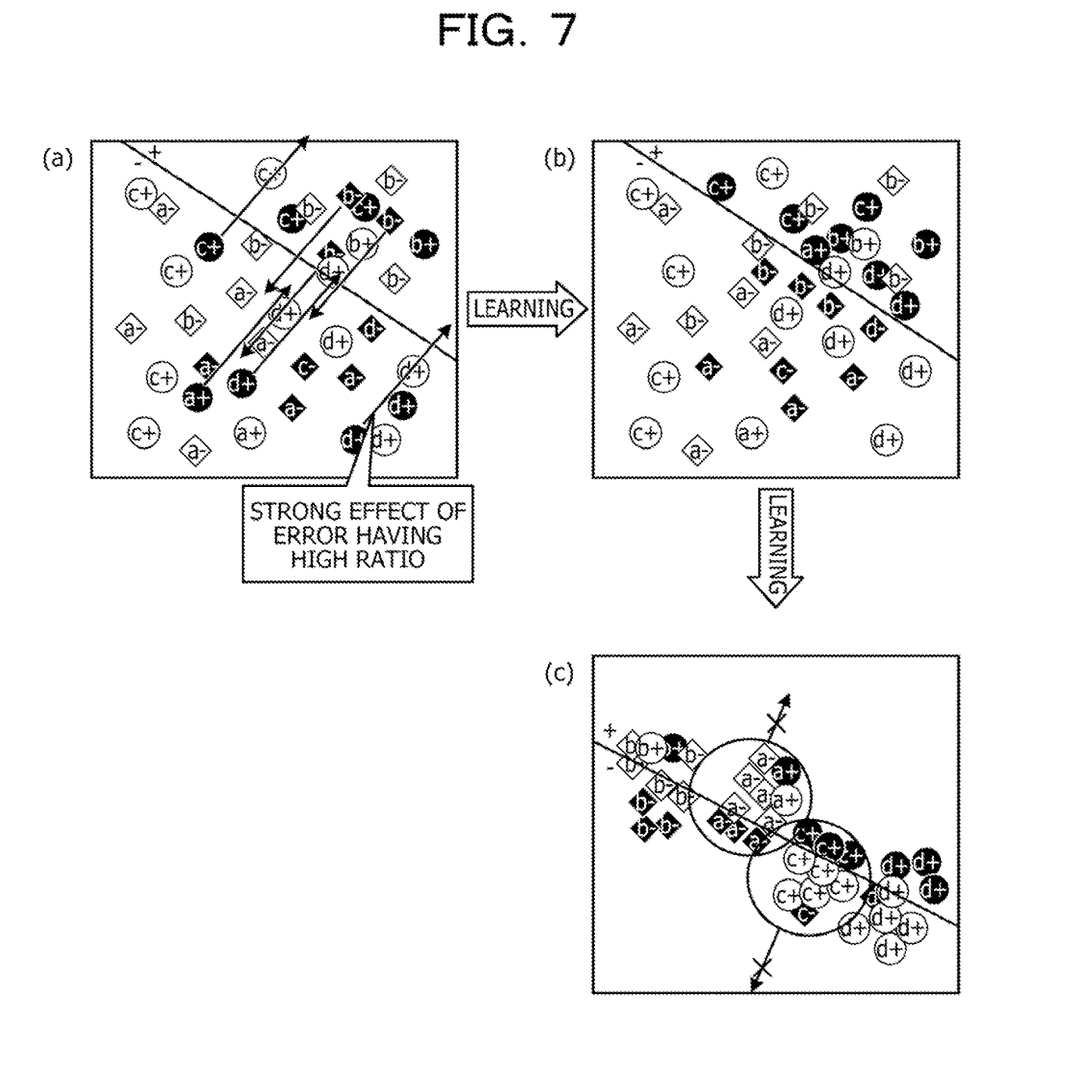
FIG. 7 is a diagram of assistance in explaining a learning result in a case where an error mixing ratio is temporarily changed by using a learning device according to the first embodiment.

FIG. 7 is a diagram of assistance in explaining a learning result in a case where an error mixing ratio is temporarily changed by using a learning device according to the first embodiment. The learning device may be the learning device 10 in FIG. 3. The following description will be made of a case of application of a mixing schedule in which the ratio of the supervised error is increased in an initial stage of learning. In this case, at first, as illustrated in (a) in FIG. 7, the features of supervised data change greatly, and a state illustrated in (b) in FIG. 7 results. For example, being subjected to a strong effect of the error having the high ratio, positive (+) data tries to move to the positive side of the separating straight line, and negative (−) data tries to move to the negative side of the separating straight line.

When the error ratio is not changed afterward, a state of (C) in FIG. 7 results. For example, when learning proceeds while the ratio of the supervised error remains high without the error ratio being changed, clustering is not performed accurately. Thus, data is not separated, and over-learning occurs. As a result, accuracy of classification of the unsupervised data is degraded. In addition, when the unsupervised error is decreased so as to perform clustering, the supervised error is increased greatly, and therefore the unsupervised learning does not progress. Hence, learning accuracy is improved as compared with the ordinary method.

Figure 8:
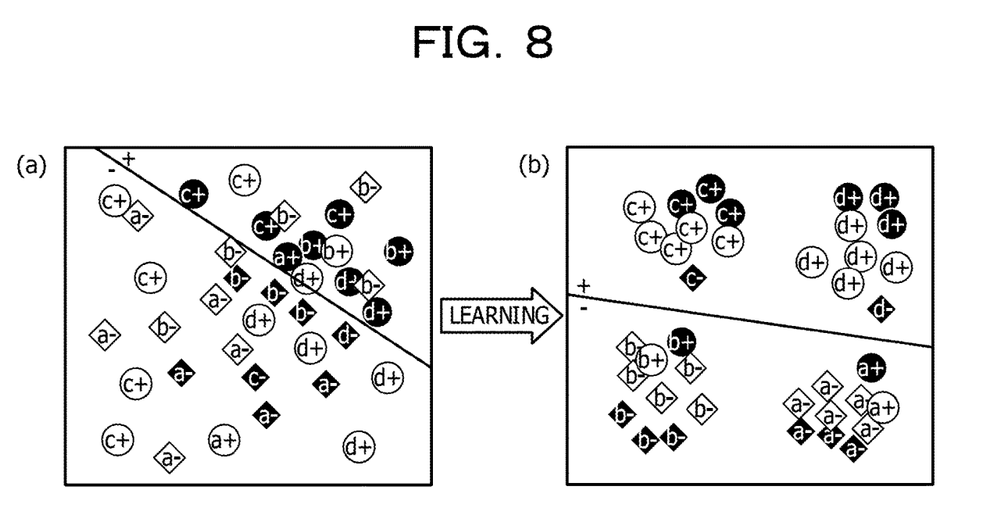
FIG. 8 is a diagram illustrating a learning result in a case where an error mixing ratio is dynamically changed by using a learning device according to the first embodiment.

FIG. 8 is a diagram illustrating a learning result in a case where an error mixing ratio is changed dynamically by using a learning device according to the first embodiment. The learning device may be the learning device 10 depicted in FIG. 3. As illustrated in (a) in FIG. 8, before learning, feature quantities are scattered randomly, and the separating straight line is present at an arbitrary position. From this state, when a mixing schedule is given such that the supervised error ratio is decreased dynamically in a stage in which initial learning is ended, a learning result with high accuracy of classification of the unsupervised data is obtained as illustrated in (b) in FIG. 8.

As described above, the learning device 10 may improve the learning accuracy of semi-supervised learning by dynamically changing a balance between the supervised error and the unsupervised error used for the learning by the encoder, and not generating the feature quantities that decrease only one error.

Second Embodiment

An embodiment of the present technology has been described thus far. However, the present technology may be carried out in various different forms other than the foregoing embodiment. Accordingly, different embodiments will be described in the following.

[Integration of Learners]

For example, in a case where the supervised learner and the unsupervised learner are constituted by a neural network or the like and are integrated with the feature generator, calculation may be simplified when both of the supervised learner and the unsupervised learner minimize the mixed error.

[Mixing Schedule]

In the foregoing embodiment, description has been made of a method in which a user makes a setting in advance according to the nature of a problem and a method in which dynamic change is made. However, it is possible to select and perform one of these methods, or possible to perform both of the methods. For example, the learning device 10 determines in advance whether to increase the ratio of the supervised error or the unsupervised error according to the nature of a problem. This may be set manually by a manager or the like, or may be determined automatically when a user generates a determination criterion.

Then, the learning device 10 starts learning with the mixing ratio determined in advance as an initial value, and is able to change the mixing ratio dynamically by the above-described method when a given time has passed or when a given number of pieces of training data are learned.

[System]

The processing procedures, the control procedures, the specific names, and the information including various kinds of data and parameters that are illustrated in the foregoing document and the drawings may be changed arbitrarily unless otherwise specified.

In addition, the respective constituent elements of the respective devices illustrated in the figures are functionally conceptual, and do not necessarily need to be physically configured as illustrated in the figures. For example, specific forms of distribution and integration of the respective devices are not limited to those illustrated in the figures. For example, the whole or a part of the devices may be configured to be distributed or integrated functionally or physically in arbitrary units according to various kinds of loads, usage conditions, and the like. Further, the whole or an arbitrary part of the respective processing functions performed in the respective devices may be implemented by a central processing unit (CPU) and a program analyzed and executed in the CPU, or may be implemented as hardware based on wired logic.

[Hardware Configuration]

Figure 9:
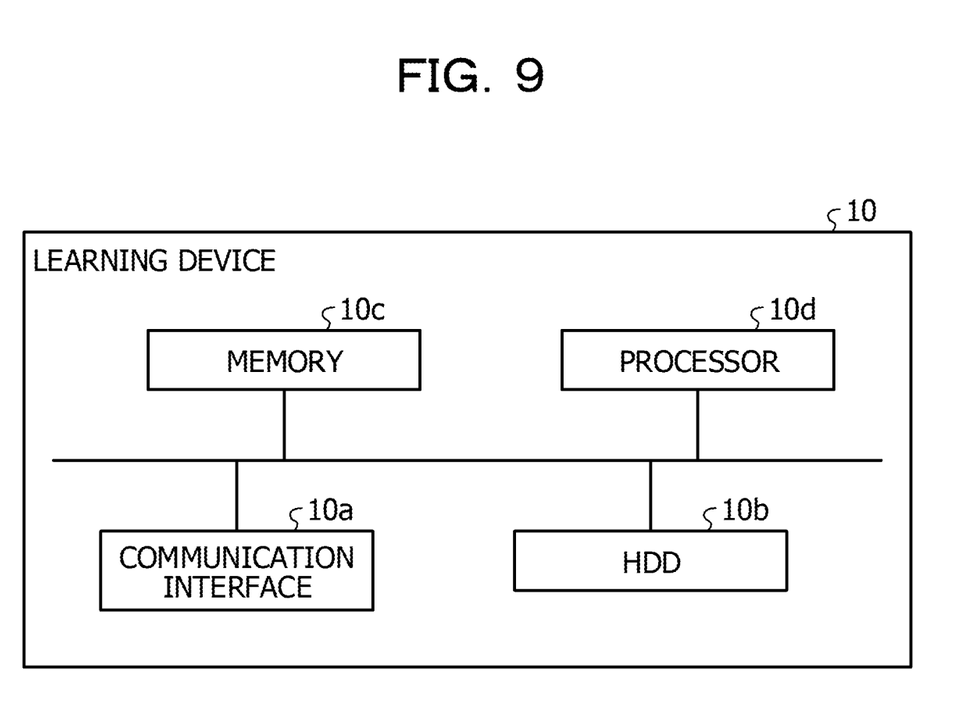
FIG. 9 is a diagram illustrating an example of a hardware configuration.

FIG. 9 is a diagram illustrating an example of a hardware configuration. As illustrated in FIG. 9, the learning device 10 includes a communication interface 10a, a hard disk drive (HDD) 10b, a memory 10c, and a processor 10d.

The communication interface 10a is a network interface card or the like that controls communication of another device. The HDD 10b is an example of a storage device that stores a program, data, and the like.

Cited as an example of the memory 10c are a random access memory (RAM) such as a synchronous dynamic random access memory (SDRAM), a read only memory (ROM), a flash memory, and the like. Cited as an example of the processor 10d are a CPU, a digital signal processor (DSP), a field programmable gate array (FPGA), a programmable logic device (PLD), and the like.

In addition, the learning device 10 operates as an information processing device that performs a learning method by reading and executing a program. For example, the learning device 10 executes a program that performs functions similar to those of the feature generator 13, the supervised learner 14, the supervised error calculator 15, the fader 16, the unsupervised learner 17, the unsupervised error calculator 18, the fader 19, and the fade controller 20. As a result, the learning device 10 may execute a process that performs functions similar to those of the feature generator 13, the supervised learner 14, the supervised error calculator 15, the fader 16, the unsupervised learner 17, the unsupervised error calculator 18, the fader 19, and the fade controller 20. It is to be noted that the program referred to in the present other embodiment is not limited to being executed by the learning device 10. The present technology may be similarly applied to, for example, a case where another computer or a server executes the program or a case where the other computer and the server execute the program in cooperation with each other.

The program may be distributed via a network such as the Internet. In addition, the program may be recorded on a computer readable recording medium such as a hard disk, a flexible disk (FD), a compact disc-read only memory (CD-ROM), a magneto-optical disk (MO), or a digital versatile disc (DVD), and executed by being read from the recording medium by a computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
   obtaining a feature quantity of input data by using a feature generator;
   generating a first output based on a labeled feature quantity obtained from labeled data of the input data by using a supervised learning processing of a neural network so that a first error between the first output and a label included in the labeled data is decreased, the label being used to determine whether the first output is correct;
   generating a second output based on an unlabeled feature quantity obtained from unlabeled data of the input data by using an unsupervised learning processing of the neural network so that a second error between the second output and the unlabeled data is decreased;
   executing machine learning of the feature generator by decreasing a sum of the first error and the second error during a learning process that includes multiple iterations;
   determining a contribution ratio between the first error and the second error in the machine learning of the feature generator;
   changing the contribution ratio during the learning process, the contribution ratio being used to acquire the sum of the first error and the second error by weighting the first error and the second error differently as the learning process proceeds; and
   repeating the executing and the determining for each iteration of the learning process.

2. The non-transitory computer-readable storage medium according to claim 1, the process further comprising:
   classifying the input data with machine learning after the learning process is complete.

3. The non-transitory computer-readable storage medium according to claim 1, wherein
   determining includes determining the contribution ratio in the process of the learning according to a specific schedule related to a timing of the changing the contribution ratio based on a result of the learning already performed.

4. The non-transitory computer-readable storage medium according to claim 1, wherein the process further comprises:
   dividing pieces of the labeled data into a data group for training and a data group for validation;
   performing the supervised learning processing based on the data group for training by using each of a plurality of ratio changing schedules that change the contribution ratio;

specifying a first ratio changing schedule from the plurality of ratio changing schedules based on the first error in a case where the data group for validation is applied to the supervised learning processing; and changing the contribution ratio in the learning according to the first ratio changing schedule.

5. The non-transitory computer-readable storage medium according to claim 4, wherein the first ratio changing schedule is a ratio changing schedule in which the first error in the case where the data group for validation is applied to the supervised learning processing is smallest among the plurality of ratio changing schedules.

6. The non-transitory computer-readable storage medium according to claim 1, wherein the process further comprises:

dividing pieces of the labeled data into a data group for training and a data group for validation;

calculating a training error by using the contribution ratio set in advance, the training error being the first error in a case where the supervised learning processing based on the data group for training is performed;

calculating a validation error, the validation error being the first error in a case where the data group for validation is applied to the supervised learning processing after the supervised learning processing based on the data group for training is performed; and determining the contribution ratio based on a result of comparison between the training error and the validation error.

7. The non-transitory computer-readable storage medium according to claim 6, wherein the calculating calculates the training error and the validation error at each timings of completion of the learning by using a predetermined number of pieces of data for training in the data group for training, the contribution ratio being determined at the each timings and being changed in the process of the learning.

8. The non-transitory computer-readable storage medium according to claim 1, wherein the determining includes:

determining the contribution ratio so that the first error contributes to the learning more than the second error at a beginning time of the learning process, and determining the contribution ratio so that a contribution of the first error is decreased at a later time of the learning process.

9. The non-transitory computer-readable storage medium according to claim 1, wherein the input data are images;

the labeled feature quantity is at least one of an edge within the images, contrast, position and shape of an object within the images;

the unlabeled feature quantity is at least one of the edge within the images, contrast, position and shape of an object within the images;

the supervised learning processing is at least one of classification and regression of the images; and the unsupervised learning processing is at least one of reconstruction, compression, noise removal, or interpolation of the images.

10. The non-transitory computer-readable storage medium according to claim 1, wherein the unlabeled data is data to which a label different from a label included in the labeled data is added or data to which no label is added.

11. The non-transitory computer-readable storage medium according to claim 1, wherein the contribution ratio is changed during the learning process, the changing of the contribution ratio reduces a mixed error during the learning process, the mixed error being a sum of the weighted first error and the weighted second error.

12. A computer-implemented learning method of training a neural network, the learning method comprising:

obtaining a feature quantity of input data by using a feature generator;

generating a first output based on a labeled feature quantity obtained from labeled data of the input data by using a supervised learning processing of the neural network so that a first error between the first output and a label included in the labeled data is decreased, the label being used to determine whether the first output is correct;

generating a second output based on an unlabeled feature quantity obtained from unlabeled data of the input data by using an unsupervised learning processing of the neural network so that a second error between the second output and the unlabeled data is decreased;

executing machine learning of the feature generator by decreasing a sum of the first error and the second error during a learning process that includes multiple iterations;

determining a contribution ratio between the first error and the second error in the machine learning of the feature generator;

changing the contribution ratio during the learning process, the contribution ratio being used to acquire the sum of the first error and the second error by weighting the first error and the second error differently as the learning process proceeds; and repeating the executing and the determining for each iteration of the learning process.

13. A learning device comprising:

a memory storing a supervised data database and an unsupervised data database, the supervised data database including labelled data in which a label identifies a subject of the labelled data, the unsupervised data database including data in which no label is added; and a processor coupled to the memory and the processor configured to execute a process, the process including:

obtaining a feature quantity of input data by using a feature generator;

generating a first output based on a labeled feature quantity obtained from labeled data of the input data by using a supervised learning processing of a neural network so that a first error between the first output and a label included in the labeled data is decreased, the label being used to determine whether the first output is correct;

generating a second output based on an unlabeled feature quantity obtained from unlabeled data of the input data by using an unsupervised learning processing of the neural network so that a second error between the second output and the unlabeled data is decreased;

executing machine learning of the feature generator by decreasing a sum of the first error and the second error during a learning process that includes multiple iterations;

determining a contribution ratio between the first error and the second error in the machine learning of the feature generator;

changing the contribution ratio during the learning process, the contribution ratio being used to acquire the sum of the first error and the second error by weighting the first error and the second error differently as the learning process proceeds; and repeating the executing and the determining for each iteration of the learning process.

\* \* \* \* \*